United States Patent
Obrecht et al.

(12)

(10) Patent No.: US 6,649,696 B2
(45) Date of Patent: Nov. 18, 2003

(54) RUBBER MIXTURES BASED ON UNCROSSLINKED RUBBERS AND CROSSLINKED RUBBER PARTICLES AND MULTIFUNCTIONAL ISOCYANATES BASED ON POLYURET

(75) Inventors: Werner Obrecht, Moers (DE); Martin Mezger, Burscheid (DE); Anthony Sumner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/929,206

(22) Filed: Aug. 14, 2001

(65) Prior Publication Data

US 2002/0123564 A1 Sep. 5, 2002

(30) Foreign Application Priority Data

Aug. 16, 2000 (DE) .......................... 100 39 749

(51) Int. Cl.$^7$ .............................. C08L 7/00; C08L 9/00; C08L 11/00; C08L 21/00
(52) U.S. Cl. ........................ 525/125; 525/126
(58) Field of Search ................. 525/125, 126

(56) References Cited

U.S. PATENT DOCUMENTS

| 3,124,605 | A | * | 3/1964 | Wagner | ........................ 521/162 |
| 4,072,702 | A | | 2/1978 | Huskins | ................ 260/453 AB |
| 4,343,339 | A | * | 8/1982 | Schwindt | ........................ 152/209 |
| 5,124,408 | A | | 6/1992 | Engels et al. | ................ 525/215 |
| 5,232,531 | A | * | 8/1993 | Dammann | ................... 156/157 |
| 5,395,891 | A | | 3/1995 | Obrecht et al. | ............. 525/194 |
| 6,127,488 | A | | 10/2000 | Obrecht et al. | .......... 525/333.3 |
| 6,207,757 | B1 | | 3/2001 | Obrecht et al. | ............. 525/194 |
| 2001/0006995 | A1 | | 7/2001 | Obrecht et al. | ............. 525/123 |

FOREIGN PATENT DOCUMENTS

| CA | 2316421 | 2/2001 |
| DE | 197 01487 | 7/1998 |
| DE | 199 19 459 | 11/2000 |
| DE | 199 42 620 | 3/2001 |
| EP | 1 063 259 | 12/2000 |

OTHER PUBLICATIONS

Angewandte Chemie, Seite 257–288, Sep. 1947, Das Di–Isocyanat–Polyadditionsverfahren (Polyurethane) Dr. Otto Bayer.

J. prakt. Chem. 336 (month unavailable) 1994 pp. 185–200, Übersichtsartikel, Review Article, Zur Synthese aliphatischer Polyisocyanate–Lackpolyisocyanate mit biuret–,Isocyanurat– oder Uretdionstruktur, Hans Josef Laas, Reinhard Halpaap und Josef Pedain.

Kunststoffhard bach, vol. 7 Chapter 10.1, pp. 540–580 (date unavailable) PUR–Anstrichstoffe und Beschichtungen, Dr. H. Koch, Dr. G. Mennicken, Dr. F. Müller, Dr. H. Toepsch, Dr. H. Träubel, W. Wieczorrek.

Houben–Weyl–Methoden der Organischen Chemie, 4$^{th}$ ed. "Makromolekulare Stoffe" part 1 to 3 (month unavailable) 1987, pp. 1994–2042. chemsch modifizierte Polymere, Dr. Manfred L. Hallensleben.

* cited by examiner

Primary Examiner—Patricia A. Short
(74) Attorney, Agent, or Firm—Joseph C. Gil; Noland J. Cheung; Jennifer R. Seng

(57) ABSTRACT

The rubber mixtures according to the present invention consisting of uncrosslinked, double bond-containing rubbers (A), crosslinked rubber particles (B) and multifunctional isocyanates based on polyuret (C), wherein, based on 100 parts by weight (phr) of the rubber components (A) respectively, the component (B) content in the mixture is 1 to 150 parts by weight and the multifunctional isocyanate content based on polyuret (component C) is 1 to 100 parts by weight, can be used to produce rubber vulcanizates and rubber molded articles of all kinds, the vulcanizates produced therefrom exhibiting an advantageous combination of mechanical properties, such as modulus at 300% elongation, elongation at break, tear strength and abrasion resistance.

8 Claims, No Drawings

RUBBER MIXTURES BASED ON UNCROSSLINKED RUBBERS AND CROSSLINKED RUBBER PARTICLES AND MULTIFUNCTIONAL ISOCYANATES BASED ON POLYURET

FIELD OF THE INVENTION

The present invention relates to rubber mixtures based on uncrosslinked rubbers and crosslinked rubber particles (so-called rubber gels) and to multifunctional isocyanates based on polyuret. The rubber mixtures according to the present invention are suitable for producing rubber vulcanizates, which exhibit an advantageous combination of mechanical properties, such as modulus at 300% elongation, elongation at break, tear strength and abrasion resistance. The vulcanizates produced from the rubber mixtures according to the present invention also have a lower density and this has a positive effect on the weight of the rubber molded articles produced from the vulcanizates, in particular tires or tire parts.

BACKGROUND OF THE INVENTION

It is known that rubber mixtures composed of uncrosslinked rubbers and crosslinked rubber particles (rubber gels) as fillers produce vulcanizates which have low rebound resilience at ambient temperature (good skid resistance in the wet) and high rebound resilience at 70° C. (low rolling resistance) during vulcanization with conventional vulcanizing agents (for example sulfur vulcanization).

Reference is made by way of example in this context to U.S. Pat. No. 5,124,408, U.S. Pat. No. 5,395,891, DE-A 197 01 488, DE-A 197 01 487, DE-A 199 29 347, DE-A 199 39 865, DE-A 199 42 620.

The reinforcing effect of the microgels in vulcanizates (modulus at 300% elongation —$S_{300}$-, elongation at break —D-, tear strength and abrasion) can be improved for industrial use. This is demonstrated, in particular, by the fact that large quantities of gel must be used to adjust industrially relevant $S_{300}$ values.

Overfilling of the mixtures results from these large quantities of gel and consequently the tear strengths and the elongations at break of the vulcanizates decrease. The object is therefore to find measures to increase the modulus of lowfilled gel-containing rubber vulcanizates. The object is also to reduce the DIN abrasion.

It is also known to vulcanize natural rubber with carbon black as filler with diisocyanates. The vulcanizates obtained in this way do not, however, have satisfactory mechanical properties. In addition, the vulcanizates adhere very strongly to the metal parts of the vulcanizing molds used (O. Bayer, Angewandte Chemie, edition A, year 59, No. 9, p. 257–288, September 1947).

SUMMARY OF THE INVENTION

According to the present invention, rubber mixtures will now be provided which allow production of vulcanizates with improved mechanical properties (product of modulus at 300% elongation and elongation at break) and a lower vulcanizate density, and this is desirable, for example, in tires or individual tire components.

The present invention, therefore, provides rubber mixtures containing uncrosslinked, double bond-containing rubbers (A), crosslinked rubber particles (B) and multifunctional isocyanates based on biuret (C), wherein, based on 100 parts by weight (phr) of the rubber components (A) respectively, the component (B) content in the mixture is 1 to 150 parts by weight and the multifunctional isocyanate content based on biuret (component C) is 1 to 100 parts by weight.

DETAILED DESCRIPTION OF THE INVENTION

Preferred rubber mixtures according to the present invention are those which, based on 100 parts by weight of the rubber component (A) respectively, have 5 to 100 parts by weight of crosslinked rubber particles (component B) and 3 to 50 parts by weight of multifunctional isocyanates based on biuret (component C).

Double bond-containing rubbers are taken to mean those rubbers which are designated R-rubbers in accordance with DIN/ISO 1629. These rubbers have a double bond in the main chain. They include, for example:

| | |
|---|---|
| NR: | natural rubber |
| SBR: | styrene/butadiene rubber |
| BR: | polybutadiene rubber |
| NBR: | nitrile butadiene rubber |
| IIR: | butyl rubber |
| BIIR: | brominated isobutylene/isoprene copolymers with bromine contents of 0.1 to 10 percent by weight |
| CIIR: | chlorinated isobutylene/isoprene copolymers with bromine contents of 0.1 to 10 percent by weight |
| HNBR: | hydrogenated or partially hydrogenated nitrile butadiene rubber |
| SNBR: | styrene/butadiene/acrylonitrile rubber |
| CR: | polychloroprene |
| ENR: | epoxidized natural rubber or mixtures thereof |
| X-NBR: | carboxylated nitrile butadiene rubbers |
| X-SBR: | carboxylated styrene butadiene copolymers. |

Double bond-containing rubbers should also, however, be taken to mean those rubbers which are called M-rubbers in accordance with DIN/ISO 1629 and, in addition to the saturated main chain, have double bonds in the side chain. These include, for example, EPDM.

The double bond-containing rubbers of the above-mentioned type to be used in the rubber mixtures according to the present invention can, of course, be modified by functional groups which can react with the functional isocyanates based on polyuret to be used and, as will be described below, can improve a coupling of the crosslinked rubber particles to the surrounding rubber matrix in the vulcanized state.

Uncrosslinked rubbers which are functionalized by hydroxyl, carboxyl, amino and/or amide groups are particularly preferred. The functional groups can be introduced directly during polymerization, by copolymerization with suitable comonomers, or after polymerization, by polymer modification.

The introduction of such functional groups by polymer modification is known and described for example in M. L. Hallensleben "Chemisch modifizierte Polymere" in Houben-Weyl Methoden der Organischen Chemie, 4th Edition, "Makromolekulare Stoffe", part 1 to 3; Georg Thieme Verlag Stuttgart, New York, 1987; pages 1994 to 2042, DE-A 2 653 144, EP-A 464 478, EP-A 806 452 and German Patent Application No. 198 32 459.6.

The quantity of functional groups in the rubbers is conventionally 0.05 to 25 wt. %, preferably 0.1 to 10 wt. %.

Crosslinked rubber particles known as rubber gels, in particular those obtained by appropriate crosslinking of the following rubbers:

| | |
|---|---|
| BR: | polybutadiene, |
| ABR: | butadiene/acrylic acid-C1-4 alkyl ester copolymers, |
| IR: | polyisoprene, |
| SBR: | styrene butadiene copolymers with styrene contents of 1 to 60, preferably 5 to 50 percent by weight, |
| X-SBR: | carboxylated styrene butadiene copolymers, |
| FKM: | fluorinated rubber, |
| ACM: | acrylate butadiene rubber, |
| NBR: | polybutadiene acrylonitrile copolymers with acrylonitrile contents of 5 to 60, preferably 10 to 50 percent by weight, |
| X-NBR: | carboxylated nitrile butadiene rubbers, |
| CR: | polychloroprene, |
| IIR: | isobutylene/isoprene copolymers with isoprene contents of 0.5 to 10 percent by weight, |
| BIIR: | brominated isobutylene/isoprene copolymers with bromine contents of 0.1 to 10 weight percent, |
| CIIR: | chlorinated isobutylene/isoprene copolymers with bromine contents of 0.1 to 10 weight percent, |
| HNBR: | partially and fully hydrogenated nitrile butadiene rubbers, |
| EPDM: | ethylene propylene diene copolymers, |
| EAM: | ethylene/acrylate copolymers, |
| EVM: | ethylene/vinyl acetate copolymers, |
| CO & ECO: | epichlorohydrin rubbers, |
| Q: | silicone rubbers, |
| AU: | polyester urethane polymers, |
| EU: | polyurethane polymers | are used in the mixtures according to the present invention as crosslinked rubber particles.

The rubber particles to be used according to the present invention conventionally have particle diameters of 5 to 1,000 nm, preferably 10 to 600 nm (diameters to DIN 53 206). They are insoluble owing to crosslinking and may be swollen in solvents, for example toluene. The swelling indices of the rubber particles ($Q_i$) in toluene are approximately 1 to 15, preferably 1 to 10. The swelling index is calculated from the weight of the solvent-containing gel (after centrifugation at 20,000 rpm) and the weight of the dry gel, wherein $Q_i$=wet weight of the gel/dry weight of the gel. The gel content of the rubber particles according to the present invention is conventionally 80 to 100 wt. %, preferably 90 to 100 wt. %.

Production of the crosslinked rubber particles (rubber gels) to be used from the basic rubbers of the above-mentioned type, is known in principle and described, for example, in U.S. Pat. No. 5 395 891 and EP-A 98 100 049.0.

In addition it is possible to increase the particle sizes of the rubber particles by agglomeration. Production of silica/rubber hybrid gels by coagglomeration is also described, for example, in the German Patent Application No. 199 39 865.8.

Of course, like the above-mentioned uncrosslinked double bond-containing rubbers, the crosslinked rubber particles can also be modified by suitable functional groups which, as mentioned above, can react with the multifunctional isocyanates to be used and/or bring about an improvement in the coupling of the rubber particles to the surrounding rubber matrix in the vulcanized state.

Preferred functional groups are again the hydroxyl, carboxyl, amino and/or amide groups. The proportion of these functional groups corresponds to the proportion of these groups in the above-mentioned, uncrosslinked, double bond-containing rubbers.

Modification of the crosslinked rubber particles (rubber gels) and introduction of the above-mentioned functional groups is also known to the person skilled in the art and described, for example, in the German Patent Applications Nos. 199 19 459.9, 199 29 347.3, 198 34 804.5.

Only modification of the corresponding rubbers in aqueous dispersion with appropriate polar monomers which can introduce a hydroxyl, amino, amide and/or a carboxyl group into the rubbers needs to be mentioned at this point.

Modified crosslinked rubber particles which are modified on the surface by —OH; —COOH; —NH$_2$; —CONH$_2$; —CONHR-groups and which are in the above-mentioned quantity range are particularly preferably used in the rubber mixtures according to the present invention.

The multifunctional isocyanates based on polyuret (component C), which have at least two isocyanate groups in the molecule, are derived from the following idealized basic structure (DE-A 11 01 394; G. W. Becker, D. Braun, Kunststoffhandbuch, Vol. 7, Hanser-Verlag; Chapter 10.1 by G. Mennicken and W. Wieczorrek, "Lacke, Anstrichmittel und Beschichtungen", page 540 ff, Laas et al J. prakt. Chem. 336 (1994) 185).

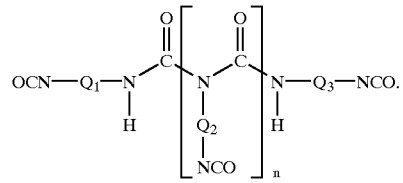

The degree of oligomerization n is 1 to 25, preferably 1 to 10. $Q_1$, $Q_2$ and $Q_3$ are aliphatic, cycloaliphatic and aromatic bridges such as hexamethylene, toluylene, diphenylmethylene, naphthylene bridges. $Q_1$, $Q_2$, $Q_3$ are derived from the known aliphatic, cycloaliphatic and the aromatic diisocyanates. Hexamethylenediisocyanate (HDI), for example, is, a representative of the aliphatic, multifunctional isocyanates. 1-isocyanato-3-(isocyanatomethyl)-3,5,5-trimethyl-cyclohexane (isophorondiisocyanate/IPDI) for example, is, a representative of the cycloaliphatic multifunctional isocyanates. Representatives of the aromatic multifunctional isocyanates include: 2,4- and 2,6-diisocynatotoluene and the corresponding industrial isomer mixture (TDI); diphenylmethanediisocyanates, such as diphenylmethane-4,4'-diisocyanate, diphenylmethane-2,4'-diisocyanate and diphenylmethane-2,2'-diisocyanate and the corresponding industrial isomer mixtures (MDI). Naphthalene-1,5-diisocyanate (NDI) and 4,4',4"-triisocyanatotriphenylmethane should also be mentioned.

To avoid a premature crosslinking reaction, for example during compounding (reduction of the susceptibility to scorching of the mixtures), it may be necessary to use the isocyanate groups in blocked form, temperature-reversible blocking (masking) of the isocyanate groups with special alcohols, phenols, caprolactams, oximes or β-dicarbonyl compounds being advantageous.

Multifunctional isocyanates based on polyuret which derive from hexamethylenediisocyanate (HDI) are particularly preferred:

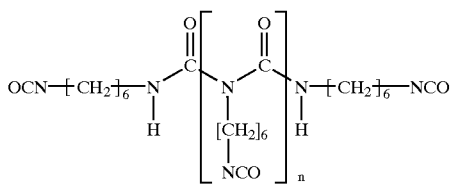

Products with such a structure are sold, for example, by Bayer AG under the names Desmodur® N 100 and Desmodur® N 3200.

The rubber mixtures according to the present invention can contain further known rubber auxiliary agents and fillers. Particularly suitable fillers for producing the rubber mixtures and vulcanizates according to the present invention are, for example:

- carbon blacks. The carbon blacks to be used in this case are produced by the lamp black, furnace or gas black process and have BET surface areas of 20 to 200 $m^2/g$, such as SAF-, ISAF-, IISAF-, HAF-, FEF- or GPF-carbon blacks.
- highly dispersed silica, produced, for example, by precipitation of solutions of silicates or flame hydrolysis of silicon halides with specific surface areas of 5 to 1,000, preferably 20 to 400 $m^2/g$ (BET surface area) and primary particle sizes of 5 to 400 nm. The silicas can optionally also be present as mixed oxides with other metal oxides, such as Al, Mg, Ca, Ba, Zn and Ti oxides.
- synthetic silicates, such as aluminum silicate, alkaline earth silicate, such as magnesium silicate or calcium silicate with BET surface areas of 20 to 400 $m^2/g$ and primary particle diameters of 5 to 400 nm.
- natural silicates, such as kaolin and other naturally occurring silicas.
- metal oxides, such as zinc oxide, calcium oxide, magnesium oxide, aluminum oxide.
- metal carbonates, such as calcium carbonate, magnesium carbonate, zinc carbonate.
- metal sulfates, such as calcium sulfate, barium sulfate.
- metal hydroxides, such as aluminum hydroxide and magnesium hydroxide.
- glass fibers and glass fiber products (laths, strands or glass microbeads).
- thermoplastic fibers (polyamide, polyester, aramide).

The fillers can be used in quantities of 0.1 to 100 parts by weight, based on 100 parts by weight, of the rubber component A.

The above-mentioned fillers can be used alone or in a mixture with one another.

Rubber mixtures which contain 10 to 100 parts by weight of crosslinked rubber particles (component B), 0.1 to 100 parts by weight of carbon black and/or 0.1 to 100 parts by weight of so-called light fillers of the above-mentioned type, based on 100 parts by weight of the rubber component A respectively, are more preferred. The quantity of fillers when using a mixture of carbon black and light fillers is approximately 100 parts by weight maximum.

The rubber mixtures according to the present invention can, as mentioned, contain further rubber auxiliary agents, such as crosslinking agents, vulcanization accelerators, antioxidants, heat stabilizers, light stabilizers, anti-ozonants, processing aids, plasticizers, tackifiers, blowing agents, dyes, pigments, wax, extenders, organic acids, retarders, metal oxides and filler activators, such as triethanolamine, polyethyleneglycol, hexanetriol, bis-(triethoxysilylpropyl)-tetrasulfide. The rubber auxiliary agents are described, for example, in J. van Alphen, W. J. K. Schönbau, M. van Tempel Gummichemikalien, Berliner Union GmbH, Stuttgart, 1956 and in the Handbuch für die Gummiindustrie, Bayer AG, 2nd Edition, 1991.

The rubber auxiliary agents are used in conventional quantities which depend, inter alia, on the application. Conventional quantities are, for example, 0.1 to 50 parts by weight, based on 100 parts by weight of rubber (A).

The rubber mixtures according to the present invention can also contain further conventional crosslinking agents such as sulfur, sulfur donors, peroxides or other crosslinking agents, such as diisopropenylbenzene, divinylbenzene, divinylether, dinvinylsulfone, diallylphthalate, triallylcyanurate, triallylisocyanurate, 1,2-polybutadiene, N,N'-m-phenylenemaleimide and/or trallyltrimellitate. The acrylates and methacrylates of polyhydric, preferably dihydric to tetrahydric $C_2$- to $C_{10}$-alcohols, such as ethylene glycol, propanediol-1,2-butanediol, hexanediol, polyethyleneglycol with 2 to 20, preferably 2 to 8 oxyethylene units, neopentylglycol, bisphenol A, glycerol, trimethylpropane, pentaerythritol, sorbitol with unsaturated polyesters of aliphatic diols and polyols and maleic acid, fumaric acid and/or itaconic acid can also be considered.

Sulfur and sulfur donors in the known quantities, for example in quantities of 0.1 to 10, preferably 0.5 to 5, based on 100 parts by weight of rubber component (A) are preferably used as crosslinking agent.

The rubber mixtures according to the present invention can also contain vulcanization accelerators of the known type, such as mercaptobenzothiazoles, mercaptosulfenamides, guanidines, thiurames, dithiocarbamates, thioureas, thiocarbonates and/or dithiophosphates. Like the crosslinking agents, the vulcanization accelerators are used in quantities of approximately 0.1 to 10 parts by weight, preferably 0.1 to 5 parts by weight, based on 100 parts by weight of rubber component (A).

The rubber mixtures according to the present invention can be produced in a known manner, for example by mixing the solid individual components in the units, such as rollers, closed mixers or mixing extruders, suited thereto. The individual components are conventionally mixed with one another at mixing temperatures of 20 to 100° C.

The rubber mixtures according to the present invention can also be produced in that, from the latices of rubber component (A), the component (B) in latex form and the other components are mixed into the latex mixture (components A+B) and subsequently worked up by conventional operations, such as evaporation, precipitation or freezing coagulation.

The primary goal, when producing the rubber mixture according to the present invention, is the mixing components being intimately mixed together and that a good dispersion of the fillers used is achieved in the rubber matrix.

The rubber mixtures according to the present invention are suitable for producing rubber vulcanizates by appropriate crosslinking reactions with the known crosslinking agents and are used to produce molded articles of all kinds, in particular to produce cable sheaths, hoses, driving belts, conveyor belts, roller coverings, tire components, shoe soles, ring seals, damping elements and diaphragms.

EXAMPLES

Example 1

Production of the Rubber Microgels

Microgel (A):

Microgel (A) was produced by starting with an SBR latex (Baystal BL 1357® produced by Bayer France, Pôrt Jérôme) by crosslinking with 1.5 phr dicumylperoxide and by grafting with hydroxyethylmethacrylate.

Baystal® BL 1357 is an SBR latex with a styrene content of 22 wt. %, a solids concentration of 37.7 wt. % and a pH of 10.2. The latex particles have the following diameters: $d_{10}=52$ nm; $d_{50}=58$ nm; $d_{80}=63$ nm; the latex particles had a density of 0.9329 g/cm$^3$. The gel content of the latex was 76 wt. %, the swelling index of the gelled portion was 57 and the glass transition temperature (Tg) was −58°C.

The Baystal® latex was crosslinked in accordance with Example 1 of EP-A 0 854 170 with 1.5 phr of dicumylperoxide. After reacting with dicumylperoxide, the latex particles had the following diameters: $d_{10}=52$ nm; $d_{50}=56$ nm; $d_{80}61$ nm; the latex particles had a density of: 0.9776 g/cm$^3$. The gel content of the latex was 97 wt. %, the swelling index of the gelled portion was 5.7 and the glass transition temperature (Tg) was −25° C.

For the modification with hydroxyethylmethacrylate, the SBR latex subsequently crosslinked with 1.5 phr dicumylperoxide was placed in a flask and the latex was diluted with water, so the solids content of the latex was 20 wt. %. After adding 3 phr of 97% hydroxymethylmethacrylate, based on the latex solids content, and adding 0.12 phr of 50% p-methanehydroperoxide, the reaction mixture was heated to 70° C. while stirring and stirred for 1 hour at this temperature. 0.05 wt. %, based on the latex solids content, of an aqueous 0.5 wt. % solution of the sodium salt of 1-hydroxymethanesulfinic acid dihydrate (Rongalit® from BASF) was then added to the mixture within 1 hour. The pH was kept constant, more precisely at pH 9, throughout the entire reaction by adding 1 N of sodium hydroxide solution. After a reaction time of 1 hour at 70° C., the latex had a percentage polymerization of 90%. The density of the latex particles was 0.987 g/cm$^3$. The particle diameters were: $d_{10}=50$ nm; $d_{50}=57$ nm; $d_{80}=61$ nm.

Prior to precipitation of the hydroxyl-modified SBR microgel, the following antioxidants, each in the quantities given, based on 100 parts by weight of solids were additionally stirred into the latex:

| | |
|---|---|
| 0.05 phr | 2,2-methylene-bis-(4-methyl-6-cyclohexylphenol) (Vulkanox® ZKF from Bayer AG) |
| 0.22 phr | di-t-butyl-p-cresol (Vulkanox® KB from Bayer AG) |
| 0.38 phr | di-laurylthiodipropionate (PS 800 from Ciba Geigy AG). |

To precipitate 5.035 kg of a 19.86% SBR latex modified with hydroxyl groups, 6,000 g of water, 795.6 g of common salt and 425 g of precipitating agent (Superfloc® C567 (1%) from American Cyanamide Corporation) were introduced.

The introduced precipitating agent was heated to 60° C. and a pH of 4 was adjusted with 10 wt. % sulfuric acid. The modified latex was introduced into the precipitating agent while maintaining this pH. After adding latex, the mixture was heated to 60° C. and then cooled to approximately 30° C. by adding cold water. The rubber gel precipitated was washed several times and after filtration at 70° C. was dried under vacuum to constant weight (approximately 60 hours).

The gel (A) obtained had a gel content of 97 wt. %, the swelling index of the gelled portion being 5.9. The hydroxyl value of the gel (A) obtained was 9 mg KOH per gram of rubber gel and the glass transition temperature Tg was −19° C.

Example 2

Production of the Rubber Mixtures, their Vulcanization and the Measured Physical Values of the Vulcanizates The mixing components (quantities in phr) listed in the following table were mixed in a conventional manner on a laboratory roller.

TABLE 1

| | Mixture No. | | | | |
|---|---|---|---|---|---|
| | 1 | 2 | 3 | 4 | 5 |
| Masticated natural rubber[1] | 100 | 100 | 100 | 100 | 100 |
| Hydroxyl-modified SBR gel (A/OBR 1031) | 30 | 30 | 30 | 30 | 30 |
| Stearic acid | 3.0 | 3.0 | 3.0 | 3.0 | 3.0 |
| Zinc oxide | 3.0 | 3.0 | 3.0 | 3.0 | 3.0 |
| Ozone protection wax[2] | 1.5 | 1.5 | 1.5 | 1.5 | 1.5 |
| IPPD[3] | 1.0 | 1.0 | 1.0 | 1.0 | 1.0 |
| TMQ[4] | 1.0 | 1.0 | 1.0 | 1.0 | 1.0 |
| Mineral oil plasticizer[5] | 3.0 | 3.0 | 3.0 | 3.0 | 3.0 |
| Sulfur | 1.6 | 1.6 | 1.6 | 1.6 | 1.6 |
| Accelerator TBBS[6] | 2 | 2 | 2 | 2 | 2 |
| Polybiuret based on hexamethylenediisocyanate[7] | — | 5 | 10 | — | — |
| Polybiuret based on hexamethylenediisocyanate[8] | — | — | — | 5 | 10 |

[1]TSR 5, Defo 700
[2]Mixture of paraffins and microwaxes (Antilux® 654 from Rheinchemie Rheinau GmbH)
[3]N-isopropyl-N'-phenyl-p-phenylenediamine (Vulcanox® 4010 NA from Bayer AG)
[4]2,2,4-trimethyl-1,2-dihydroquinoline (polymeric) (Vulcanox® HS from Bayer AG)
[5]Enerthene® 1849-1 from BP Oil GmbH
[6]N-tert. butyl-2-benzothiazylsulfenamide (Vulkacit NZ® from Bayer AG)
[7]Desmodur N® 100 from Bayer AG
[8]Desmodur N® 3200 from Bayer AG The vulcanization behavior of the mixtures is investigated in the Rheometer at 160° C. to DIN 53 529 using the Monsanto Rheometer MDR 2000E. In this way, characteristic data such as $F_a$, $F_{max}$, $F_{max.} - F_{a.}$, $t_{10}$, $t_{80}$ and $t_{90}$ was determined.

TABLE 2

| | Mixture No. | | | | |
|---|---|---|---|---|---|
| | 1 | 2 | 3 | 4 | 5 |
| $F_a$ [dNM] | 0.38 | 0.92 | 1.73 | 1.23 | 2.02 |
| $F_{max} - F_a$ [dNM] | 10.42 | 10.15 | 9.69 | 9.72 | 8.89 |
| $t_{10}$ [min.] | 4.48 | 3.65 | 3.49 | 3.57 | 3.32 |
| $t_{80}$ [min.] | 6.74 | 6.34 | 6.29 | 6.17 | 5.99 |
| $t_{90}$ [min] | 8.58 | 7.58 | 7.32 | 7.37 | 6.96 |

According to DIN 53 529, Part 3:
$F_a$: is the minimum cure meter display of the crosslinking isotherms
$F_{max}$: is the maximum cure meter display
$t_{10}$: is the time which 10% of the conversion are achieved
$t_{80}$: is the time which 80% of the conversion are achieved
$t_{90}$: is the time which 90% of the conversion are achieved.

The mixtures are vulcanized in the press at 160° C., the following vulcanization times being selected:

TABLE 3

| | Mixture No. | | | | |
|---|---|---|---|---|---|
| | 1 | 2 | 3 | 4 | 5 |
| Vulcanization time [min] | 20 | 17 | 17 | 16 | 16 |

The following properties were determined on the vulcanizates:

TABLE 4

| | Mixture No. | | | | |
|---|---|---|---|---|---|
| | 1 | 2 | 3 | 4 | 5 |
| Tensile strength (F) [MPa] | 27.3 | 26.1 | 24.5 | 26.7 | 22.7 |
| Elongation at break (D) [%] | 605 | 540 | 435 | 515 | 400 |
| Modulus at 100% elongation ($S_{100}$) [MPa] | 1.5 | 2.1 | 2.4 | 2.2 | 2.3 |
| Modulus at 300% elongation ($S_{300}$) [MPa] | 4.9 | 7.7 | 12.0 | 8.8 | 12.7 |
| Shore A hardness, 23° C. | 54 | 62 | 65 | 60 | 63 |
| Shore A hardness, 70° C. | 50 | 54 | 58 | 52 | 56 |
| Rebound resilience, 23° C. [%] | 46 | 44 | 52 | 49 | 55 |
| Rebound resilience, 70° C. [%] | 67 | 63 | 67 | 65 | 69 |
| Abrasion of 60 lubricating gel [$mm^3$] | 160 | 104 | 74 | 103 | 110 |
| $S_{300} \times D$ | 2965 | 4120 | 4697 | 4532 | 5080 |

Result:

By using polyurets based on diisocyanate (Desmodur® N 100 and Desmodur® N 3200), higher degrees of hardness, higher moduli and lower abrasion values were found in the gel-filled vulcanizates than in the gel-filled polyuret-free comparison vulcanizate. In addition, the level of the mechanical properties, characterized by the product ($S_{300} \times D$), is improved by the additions of polyuret.

What is claimed:

1. Rubber mixtures consisting of a non-functionalized uncrosslinked, double bond-containing rubbers (A), crosslinked rubber particles having particle diameters of 5 to 1,000 nm and swelling indices in toluene of 1 to 15 (B) and multifunctional isocyanates based on polyuret (C) having the formula

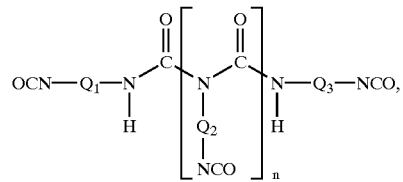

wherein n is 1 to 25, $Q_1$, $Q_2$ and $Q_3$ are selected from the group consisting of aliphatic, cycloaliphatic and aromatic bridges, based on 100 parts by weight (phr) of the rubber components (A) respectively, the component (B) content in the mixture is 1 to 150 parts by weight and the multifunctional isocyanate content based on said polyuret is 1 to 100 parts by weight.

2. Rubber mixtures according to claim 1, wherein based on 100 parts by weight of the rubber component (A) respectively, there are 5 to 100 parts by weight of crosslinked rubber particles (B) and 3 to 50 parts by weight of multifinctional isocyanates (C) in the rubber mixture.

3. Rubber mixtures according to claim 1, wherein isocyanates with at least two isocyanate groups in the molecule are used as multifunctional isocyanates based on polyuret (C).

4. Rubber vulcanizates comprising rubber mixtures according to claim 1.

5. Rubber vulcanizates according to claim 4, wherein based on 100 parts by weight of the rubber component (A) respectively, there are 5 to 100 parts by weight of crosslinked rubber particles (B) and 3 to 50 parts by weight of multifunctional isocyanates (C) in the rubber mixture.

6. Rubber vulcanizates according to claim 4, wherein isocyanates with at least two isocyanate groups in the molecule are used as multifunctional isocyanates based on polyuret (C).

7. A rubber molded article comprising rubber mixtures according to claim 1.

8. A rubber molded article according to claim 7, wherein said rubber molded article is a cable sheath, hose, driving belt, conveyor belt, roller covering, tire component, shoe sole, ring seal, damping element or diaphragm.

* * * * *